Oct. 11, 1949.  F. W. SIDE  2,484,593
STANDARD CELL CONSTRUCTION
Filed Aug. 15, 1946  2 Sheets-Sheet 1

INVENTOR.
FREDERICK W. SIDE
BY
ATTORNEY.

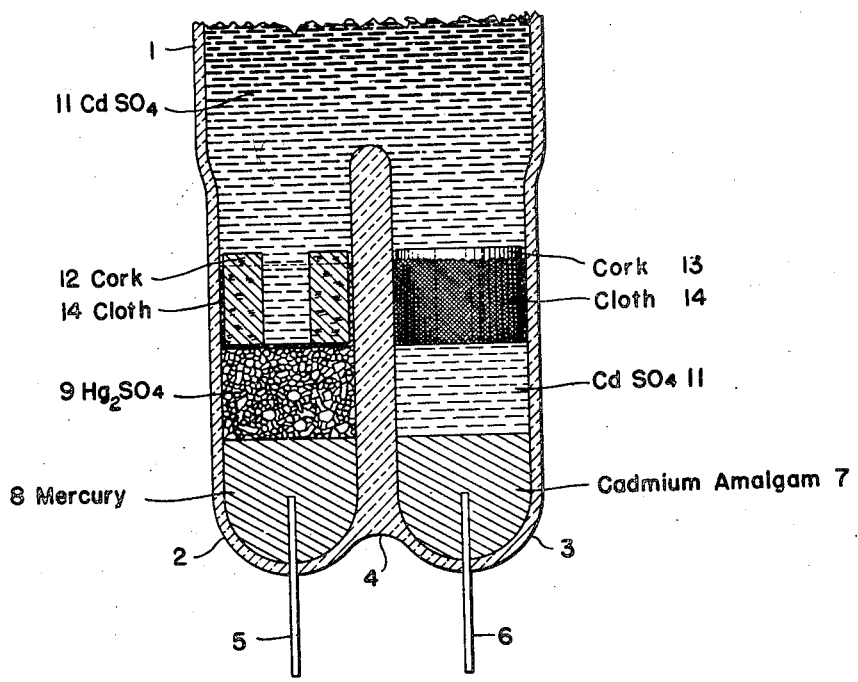

Patented Oct. 11, 1949

2,484,593

UNITED STATES PATENT OFFICE 2,484,593

STANDARD CELL CONSTRUCTION

Frederick W. Side, Philadelphia, Pa., assignor, by mesne assignments, to Minneapolis-Honeywell Regulator Company, Minneapolis, Minn., a corporation of Delaware Application August 15, 1946, Serial No. 690,792

5 Claims. (Cl. 136—88)

The present invention relates to primary cells and more particularly to standard cells of the Weston type which are used as voltage standards in potentiometric work.

Standard cells are used extensively for calibration purposes in potentiometers which are used for measuring small voltages accurately. For this purpose the output of the cell should not vary. It is known, however, that the output of the cell will change if the temperatures of the two legs of a conventional H-shaped cell are varied even a small amount. When using these cells in a potentiometer instrument, for example, it is frequently necessary, because of space or construction limitations, to mount them adjacent a heat producing device such as a motor. Unless extreme care is used one leg of the cell is likely to be nearer the motor than the other leg with a consequent increase in temperature of the first leg with respect to the second. This means that the voltage of the cell will vary from its standard, calibrated value. Another difficulty with the presently obtainable standard cells is that their size is such that they require more space than is often readily available in modern potentiometer instruments.

It is an object of the present invention to overcome the above mentioned difficulties by making a standard cell that is small in size and one that has its two legs joined by a temperature equalizing portion. Ordinarily the internal resistance of a standard cell varies directly with the distance between the two electrodes and inversely with the area of the legs. In the cell of the present invention the reduction in area of the legs is substantially compensated for by the shortening of the distance between the electrodes. Thus, the present cell, in spite of its small size, has an internal resistance that is not appreciably larger than that of the larger commercially available types that are in general use today.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

In the drawings:

Figure 3 is a vertical longitudinal cross section on line 3—3 of Figure 2.

The standard cell of this invention comprises a glass tube 1 which has had its lower portion formed into two legs 2 and 3 which are joined by a flange or web of glass 4. Preferably the cell blank starts out as a closed end glass tube, such as an ordinary laboratory test tube made of glass. This tube is suitably worked upon so that the two legs 2 and 3 will be formed. Platinum electrodes 5 and 6 are then fused into the bottom of the legs respectively. Inasmuch as the legs are separated and the blank was originally a tube the glass extending between the legs forms a flange or web between the legs. This is a highly desirable feature since it serves both to strengthen the cell blank and to form a temperature conducting connection between the legs of the cell.

Figure 1:
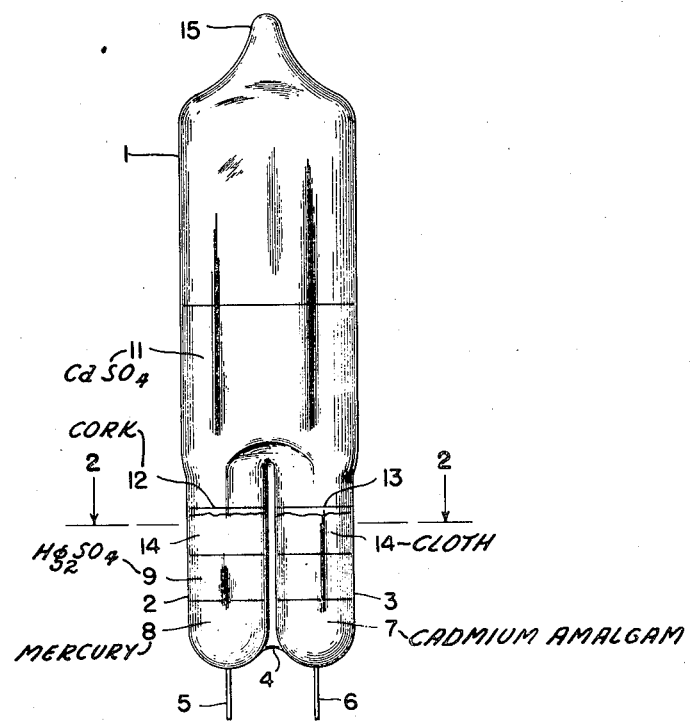
Figure 1 is a view of the standard cell.
Figure 2:
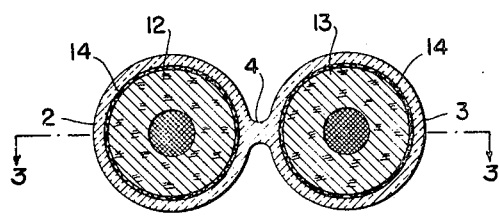
Figure 2 is a view taken on line 2—2 of Figure 1.

After the cell blank has been made the various chemicals are placed in the blank. A body of cadmium amalgam 7 is placed in the bottom of the negative leg 3 in good electrical contact with the platinum electrode 6. This cadmium amalgam is formed by mixing mercury and cadmium. The mixture is heated so that it becomes sufficiently fluid to be poured into the bottom of the negative leg 3. As shown at 8 a body of pure mercury is placed at the bottom of the positive leg 2. Above this mercury in leg 2 is placed mercurous sulphate paste 9. An amount of electrolyte 11, which is a solution of cadmium sulphate, is then poured into the blank above the solid ingredients to a level even with the top of the legs 2 and 3. In order to maintain the amalgam and the mercurous sulphate in the cell legs it is customary to employ some type of dam or baffle. In this case small corks 12 and 13, that are provided with suitable apertures in their centers as is shown in Figure 2, are placed one in each leg of the cell above the solid ingredients. It is not ncessary that the cork be in engagement with these ingredients so long as it is tight enough to stay in place as the cell is tilted in transportation or use. In some cases it may be desirable or necessary to provide a linen washer 14 around the corks in order to hold them tightly in place and in order to provide a dam or barrier across the openings that are provided therein. This may be accomplished by merely forming a disk of linen in a slightly cupped shape so that when the cork is moved into place the linen will be carried in with it. The linen washer will be engaged on both sides by the electrolyte so that it will not have any effect on the ion path during the operation of the cell. When the corks are in place the remainder of the electrolyte is placed in the cell to a level sufficient so that the finished cell may be laid on its side and still have the electrolyte bridge the legs. When the various chemical ingredients are in place the upper end of the cell blank can be heated and sealed off above the level of the electrolyte as is shown at 15. It is noted that cells made in accordance with the present invention have a total length of approximately two and one-half inches and a diameter of approximately three-quarter inch. Each of the legs is approximately five-sixteenths inch in diameter and approximately five-eighths inch long.

A cell of the type described above has many advantages not the least of which is its small size. In a study of this type of cell it has been determined the size of the cell and the amount of the chemical ingredients used in its manufacture have no effect on the voltage which it produces. A cell of this type will produce, when properly manufactured, exactly the same voltage which is produced by the conventional shape large size standard cells of the Weston type.

It is known that the internal resistance of a standard cell varies directly with the distance between the electrodes and inversely with the area of the legs. This fact has been to some extent a controlling feature in the size of commercially available standard cells. If the conventional H-shaped blank is made in smaller size the internal resistance of the cell increases to almost prohibitive values. With the cell of the present invention, however, the disadvantage of the small diameter legs is substantially overcome by the very short ion path between the two electrodes. An additional advantage of the present cell over the conventional H-shaped cell, and particularly a small one, is the simplified glass forming operation that is required.

It has been known for a long time that the voltage output of a standard cell varied considerably when the legs of the cell were at different temperatures. Consequently these cells must be so mounted that they are not in drafts and so that they are not located too near a heat producing body. If this is done one leg is likely to get hotter than the other and the cell can no longer be used for standardizing purposes. The reason for this is that the positive or mercurous sulphate leg of the cell has a positive temperature coefficient while the amalgam leg has a negative temperature coefficient. These two coefficients are substantially the same and will effectively offset each other if the temperature of the cell as a whole is raised or lowered within reasonable limits. This particular defect in the conventional standard cell is effectively overcome by the construction of the present cell since the two legs of the cell are close together and joined by the heat-conducting flange 4 which extends between them. Due to the small size of the cell and the heat conducting capacity of the glass the chances of one leg of the cell being at a different temperature than the other leg are inconsequential.

In the conventional standard cell enough electrolyte must be used so that the cross member of the H and the lower half of each of the legs are connected in an electrical path. The amount that one of these cells can be moved out of the vertical is limited by the amount of electrolyte that can be placed in the cell. With a construction of the type disclosed herein the electrolyte which is placed in the upper part of the cell blank is sufficient so that the cell may be operative even when it is laid on its side. The ability to form a cell in which its operative position is not critical is of great importance.

From the above description it will be seen that this invention is directed to a novel type of construction to be used for a standard cell. The cell produced is one whose usefulness is not limited to a constant temperature location or to a location in which the position of the cell is critical. Because of the fact that the cell can be moved to various positions and still have its electrical path closed it is possible to use a cell of this type in portable instruments wherein they have never before been used.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. A standard cell consisting of a closed tubular body formed at its lower end with a pair of tubular legs, said legs being joined with a heat-conducting flange, and an electrode inserted in each leg.

2. A standard cell consisting of a closed tubular glass body, a pair of tubular glass legs extending side by side from one end of said body and integral and in communication therewith, said legs being joined by a flange, and an electrode extending from each leg.

3. A standard cell comprising a closed one piece tubular glass body, a pair of glass legs unitary with said body and extending from said body in side by side relation and having a total area less than that of said body, and a flange of glass joining said legs throughout their entire length.

4. A standard cell comprising a closed tubular glass body having a pair of integrally formed legs projecting from one end thereof, said legs each being of a smaller diameter than said body, a body of cadmium amalgam in one leg, a perforated dam in said leg above said amalgam, a body of mercury in the other leg, a body of mercurous sulphate in said other leg above said mercury, a perforated dam in said other leg above said mercurous sulphate, an electrolyte of a solution of cadmium sulphate filling the remainder of said legs and a portion of said body, a glass flange connecting said legs, an electrode extending through one leg into contact with said cadmium sulphate, and an electrode extending through the other leg into contact with said mercury.

5. A standard cell comprising a closed tubular body having a homogenous portion forming a pair of legs extending from one end of said body, a flange joining said legs, an electrode extending from each leg, and chemically active voltage producing material in said legs and a portion of said body.

FREDERICK W. SIDE.

REFERENCES CITED

The following references are of record in the file of this patent:

UNITED STATES PATENTS

| Number | Name | Date |
|---|---|---|
| 1,528,076 | Rodman et al. | Mar. 3, 1925 |
| 1,887,531 | Wein | Nov. 15, 1932 |

OTHER REFERENCES

Fleming, Centralblatt fur Electrotechnik, vol. 8, No. 32 (1886), page 712.